(12) United States Patent
Malik et al.

(10) Patent No.: US 11,159,963 B2
(45) Date of Patent: Oct. 26, 2021

(54) ALTERNATIVE NETWORK COMMUNICATION FOR ACCESS POINT TROUBLESHOOTING AND MONITORING

(71) Applicant: Meru Networks, Sunnyvale, CA (US)

(72) Inventors: Ajay Malik, Sunnyvale, CA (US); Saurabh Bhargava, San Jose, CA (US); Avinash Bhagtani, Pleasanton, CA (US); Radhakrishnan Suryanarayanan, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 1038 days.

(21) Appl. No.: 14/849,573

(22) Filed: Sep. 9, 2015

(65) Prior Publication Data

US 2016/0112886 A1    Apr. 21, 2016

Related U.S. Application Data

(60) Provisional application No. 62/048,243, filed on Sep. 9, 2014.

(51) Int. Cl.
| | |
|---|---|
| *H04W 24/04* | (2009.01) |
| *H04W 4/80* | (2018.01) |
| *H04W 84/12* | (2009.01) |
| *H04W 88/08* | (2009.01) |

(52) U.S. Cl.
CPC ............. *H04W 24/04* (2013.01); *H04W 4/80* (2018.02); *H04W 84/12* (2013.01); *H04W 88/08* (2013.01)

(58) Field of Classification Search
CPC ..... H04B 5/0031; H04B 17/318; H04L 67/10; H04W 4/008; H04W 12/04; H04W 24/04; H04W 36/08; H04W 36/30; H04W 36/0072; H04W 72/04; H04W 84/12; H04W 88/12
See application file for complete search history.

(56) References Cited

U.S. PATENT DOCUMENTS

| | | | | |
|---|---|---|---|---|
| 2013/0208713 | A1* | 8/2013 | Hamade ............... | H04W 88/08 370/338 |
| 2014/0137188 | A1* | 5/2014 | Bartholomay ...... | H04L 65/4084 726/3 |
| 2014/0235170 | A1* | 8/2014 | Zhang .................. | H04W 4/008 455/41.2 |
| 2015/0350933 | A1* | 12/2015 | Mannemala .......... | H04W 24/04 370/225 |

* cited by examiner

*Primary Examiner* — Marsha D Banks Harold
*Assistant Examiner* — Dharmesh J Patel
(74) *Attorney, Agent, or Firm* — Law Office Of Dorian Cartwright; Dorian Cartwright

(57) ABSTRACT

The present description provides methods, computer program products, and systems for alternative network communication for access point troubleshooting and monitoring. When a station has difficulty initiating or maintaining a connection with an access point, or even when performance is suboptimal, alternative network communication is initiated. The issue can be handled by reporting to a troubled access point for self-correction, or by uploading interrogation commands or code for active correction externally by a station. Further actions can be taken, for example, when a station determines through alternative communication that a troubled access point itself has connection issues to a back end network, the station uses a different access point for reporting up to a network admin. Although Wi-Fi and Bluetooth are described herein, other combinations of wireless protocols are implementable.

10 Claims, 6 Drawing Sheets

ALTERNATIVE NETWORK COMMUNICATION FOR ACCESS POINT TROUBLESHOOTING AND MONITORING

CROSS-REFERENCE TO RELATED APPLICATIONS

This application claims the benefit of priority under 35 U.S.C. 119(e) to U.S. Application No. 62/048,243, Sep. 9, 2014, entitled ALTERNATIVE NETWORK COMMUNICATION FOR ACCESS POINT TROUBLESHOOTING AND MONITORING, by Ajay Malik, et al., the contents of which hereby incorporated by reference in its entirety.

FIELD OF THE INVENTION

The invention relates generally to computer networking, and more specifically, to using alternative network communication for troubleshooting and monitoring access points and other network resources.

BACKGROUND

Wireless computing technologies provide untethered access to the Internet and other networks. Access points are critical to providing for individual wireless stations a connection to local area networks and the Internet. However, the individual wireless stations have no way to report to a back end network that a particular access point is not responsive, given that the access point is currently needed for these communications.

In some cases, an access point is unknowingly powered off, is in the process of rebooting, or has entered a sleep mode, so no connection is possible. In other cases, communication is suboptimal due to ambient noise, poor signals, low memory conditions, processor loads, hacker activity, and the like. In still another case, a wired connection between an access point and a back end network can be inoperable due to being physically disconnected, driver issues, and the like.

What is needed is a technique that provides alternative mechanisms of communication for troubleshooting access points. Furthermore, once the alternative mechanisms are activated, triage, monitoring, security and other activities can provide additional information.

SUMMARY

These shortcomings are addressed by the present disclosure of methods, computer program products, and systems for directing station roaming in a cloud-managed Wi-Fi network.

In one embodiment, access is provided for at least one station over a Wi-Fi channel to connect with a wired backbone network. A triggering event indicative of a communication issue associated with the access point is detected based on one or more predefined conditions or events. Events can include link outages, loss of contact with a specific device, long lag times, sleep mode, powering on or off, high congestion, low congestion, malware or suspicious activity, and the like. Triggering events can also deactivate alternative channels once an event or condition has ended. In some cases, an external resource such as the controller 130 can force a triggering event. Other triggering events can be programmed such as periodic downtimes.

In another embodiment, responsive to the triggering event detection, a Bluetooth channel for communication with the at least one station for collecting data associated with the triggering event is established. Responsive to the triggering event end, access for the at least one station over the Wi-Fi channel is resumed.

Other primary or alternative network components or combinations are possible.

Advantageously, blind spots are eliminated and information from downed devise can be gathered.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present description provides methods, (non-transitory) computer program products, and systems for alternative network communication for access point (and other network resource) troubleshooting and monitoring.

Generally, one of ordinary skill in the art will recognize that the examples set forth herein are non-limiting and only illustrative of widely-applicable principles. For example, Although Wi-Fi and Bluetooth are described herein as primary and alternative networks, respectively, other combinations of wireless protocols are implementable.

II. Systems for Alternative Network Communication (FIGS. 1-4)

Figure 1:
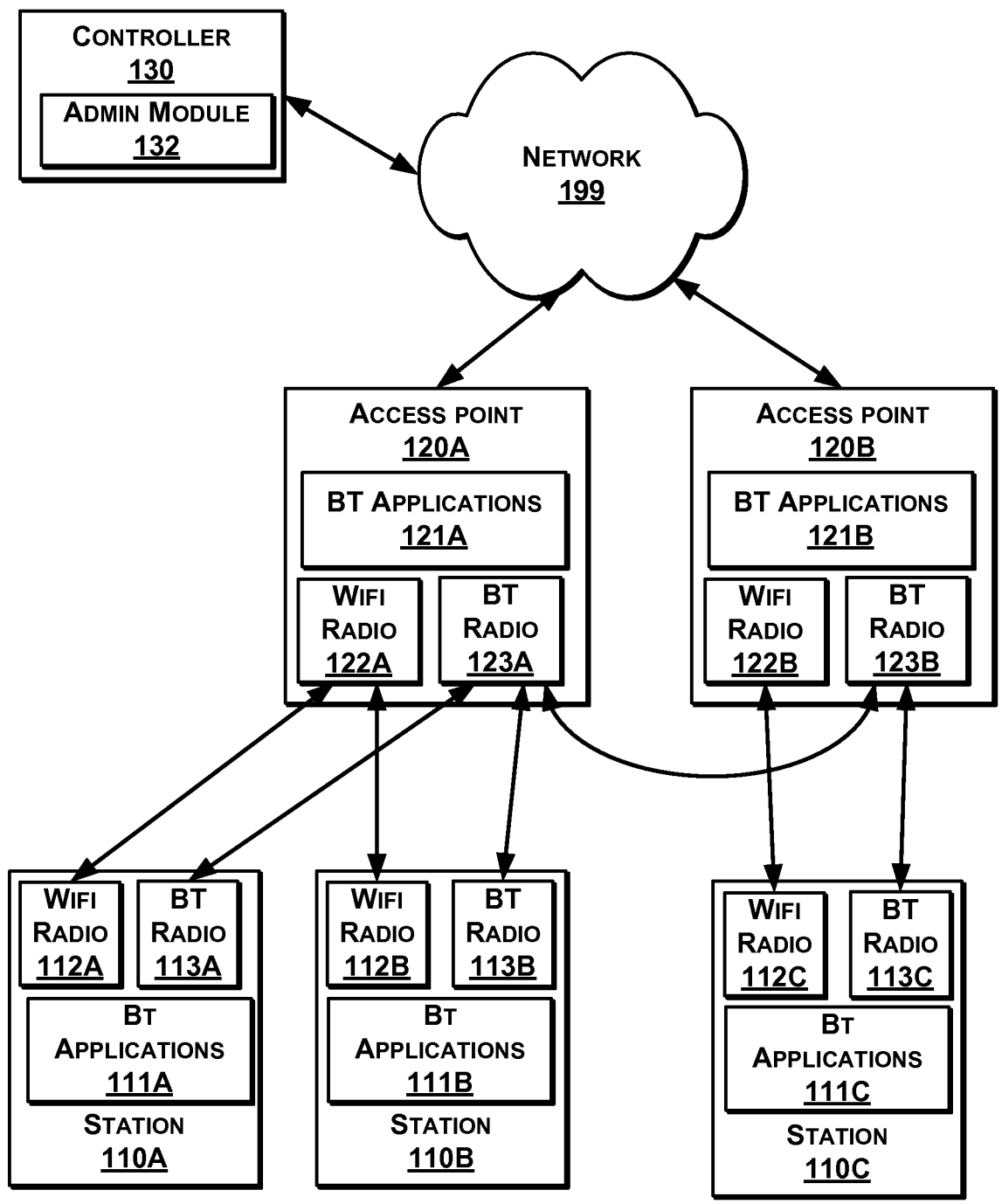
FIG. 1 is a high-level block diagram illustrating a system for alternative network communication for access point troubleshooting and monitoring, according to one embodiment.

FIG. 1 is a high-level block diagram illustrating a system 100 of alternative network communication for access point troubleshooting and monitoring, according to one embodiment. The system 100 includes access points 120A-B coupled to stations 110A-BC and also coupled to a network 199 (e.g., a LAN, WAN, the Internet, a cloud-based network, a data network, a cellular network, a hybrid network, or the like). A controller 130 is also coupled to the network. The system 100 is merely an example of many possible configurations which could include more or less access points, more or less stations, or include additional components such as routers, switches, firewalls, and the like. The network components can be implemented as hardware, software, or a combination of both, and as a single device, multiple distributed devices, or virtual devices.

More general aspects of the system 100 include a full Bluetooth network operates alongside the Wi-Fi or wired network. The Bluetooth network can include Bluetooth routers and switches allowing an extension of communication beyond a direct connection between a station proximate to an access point. When referring to a Bluetooth network, communications can be purely via Bluetooth devices or have some links over other types of devices such as 4G or Wi-Fi devices (e.g., to overcome inherent limitations of Bluetooth such as range).

Other aspects of the system 100 can be implemented in conjunction with a network security system, for example, the FortiGate Network Security platform by Fortinet of Sunnyvale, Calif. For example, a security breach or suspicious activity can be reported via an alternative channel to prevent detection or interception by rogue devices or processes directed towards a primary communication channel. Also, information collected from a downed link can be sent via alternative link to a firewall to prevent further infections.

In some implementations, the system 100 can serve, for example, a business enterprise, a hospital or system of hospitals, a school, building, a private network, or the like. A combination of wired and wireless devices can be connected, as well as only wireless devices or only wired devices.

In some embodiments, the access points 120A-B include one or more individual access points that interact with stations 110A-C to provide medium access through a channel such as Wi-Fi, and an alternative communication channel using a channel such as Bluetooth. In one embodiment, the access points 120A-B comprise BT applications 121A-B, Wi-Fi radio 122A-B and BT radio 123A-B, respectively. The Wi-Fi radios 122A-B can each be an IEEE 802.11 or other radio to perform standard communications with stations 110A-C or others utilizing the network 199. In more detail, an access point can periodically transmit beacon frames that advertise its presence with embedded BSSIDs. An access point, in turn, responds with a connection request frame using an appropriate BSSID. The access point can select which of available access points to connect with the BSSID because the unselected access point will ignore BSSIDs associated with other access points. In other cases, an access point can initiate connections with a probe frame seeking available BSSIDs.

Communication issues over Wi-Fi can occur during connection attempts or after a connection has been established. For example, a device can be rebooting or frozen so that a timely response is not made. Additionally, a burdened device can have limited resources for processing, memory or network bandwidth. In some examples, interference, shielding, or other signal degradations can occur in space between communicating devices. A device can also intentionally refuse connections, such as when steering devices to other access points.

The BT radios 123A-B can activate alternative communication channels responsive to triggering events. In one embodiment, the BT radios 123A-B provide a physically separate and independent channel of communication with stations 110A-C. Consequently, when access points 120A-B are not reachable by stations 110A-C via the normal Wi-Fi radio communication as set forth by IEEE 802.11, an alternative channel can be activated. A Bluetooth radio added to an access point opens up numerous additional communication options. First, wireless devices such as smart phones already equipped with Bluetooth radios are able to establish Bluetooth communication with access points. Second, access points can now communicate with each other over an alternative network. Third, a network administrator can connect via Bluetooth to perform tasks. In many prior art access points, Bluetooth radios were not included, and even in devices that may include Bluetooth radios, they would not be configured for alternative troubleshooting reporting as described herein. In some implementations, Bluetooth only supports one-to-one, or a limited number of connections, so multiple simultaneous device connections are not possible, as needed for a primary communication channel. Pairing generally describes the process of establishing a Bluetooth link as a mater/slave relationship. More specifically, at least one device enters a discoverable mode for detection by other devices in the vicinity. Once found, a passkey is exchanged for security.

BT radios 123A-B can be configured for Bluetooth 3.0, 4.0, 4.1, Bluetooth Low Energy, or any other Bluetooth standard. The BT radio 123A-B can be on OEM (original equipment manufacturer) product embedded on a separate motherboard, be integrated onto a custom motherboard (e.g., in combination with a Wi-Fi radio, and/or a CPU), or be plugged via USB or other port. Functionality can be implemented in hardware (e.g., a semiconductor chip), software (e.g., source code or application level commands), or a combination.

In an embodiment, the BT applications 121A-B represent functionality corresponding to BT radio 123A-B communication, including detection of triggering events that cause an alternative communication channel to be established. In some embodiments, BT applications 111A-C detect trouble with connecting to one or more of the access points 120A-B, or in other words, detects a triggering condition. In response, one or more of BT radios 113A-B are activated for back channel communications to the trouble access point. Once connected, a variety of actions are possible, ranging from mere notification of failed connection attempts for logging, to active interrogation of the trouble access point to find a solution.

The BT applications 121A-B can be implemented in hardware, software (e.g., local source code or cloud-based software), or in combination. More particularly, the BT applications 121A-B can be implemented as standalone applications, operating system capabilities, within a processor, or any combination of implementations. The BT applications 121A-B can include a detector (e.g., daemon) that initializes deeper functionality for troubleshooting and the like responsive to an incoming Bluetooth connection or other triggering condition. Examples of the BT applications 121A-B are set forth in further detail below with respect to FIG. 2.

An individual access point can be any of the computing devices described herein. For example, the access points 120A-B can be an AP 110 or AP 433 (modified as discussed herein) by Meru Networks of Sunnyvale, Calif. Each access point 120A-B is preferably connected to the network 199 (e.g., gateway, switch, router, hub, or another access point that is connected to the network 199) via a wired connection, but in some embodiments, such as a mesh network, the uplink connection is wireless. The access points 120A-B can be set-up in various configurations to provide wireless coverage areas. In another embodiment, the functionality is incorporated into a switch or router.

The stations 110A-C utilize an alternative communication channel for communicating with the access points 120A-B. The Wi-Fi radios 112A-C and the BT radios 113A-C of the stations 110A-C can be the any of the embodiments as described above with reference to Wi-Fi radios 122A-B and BT radios 123A-B of the access points 120A-B, and operate in conjunction with each other for communications.

The BT applications 111A-C of the stations 110A-C can also operate in conjunction with the BT applications 121A-B of the access points 120A-B. However, in some embodiments dual sided BT applications are not necessary and are present only on one side. For example, a BT application on a station side can interrogate access points by sending test packets to test flight time, check for responsiveness from different aspects of applications and operating systems on access points, sending commands, and the like. A cooperative BT application can enhance and optimize interrogations with higher permissions and access to local conditions. Also, data can be collected even when there is no Bluetooth access to the access points 120A-B. In some embodiments, the BT applications 111A-C can be slim versions such as smartphone apps.

The stations 110A-C can be, for example, a personal computer, a laptop computer, a tablet computer, a smart phone, a mobile computing device, an Internet appliance, a non-wireless device modified to have wireless capabilities, or any other computing device. A station is wirelessly coupled to an access point. No pre-configuration or client is needed, in embodiments. However, in other embodiments, BT applications 111A-C are downloaded from access points 120A-B at an initial connection or during configuration.

In one embodiment, the controller 130 receives outage and other types of information collected via alternative networks. In still another embodiment, the controller 130 initiates interrogations over alternative networks. Admin module 132 executes on the controller 130 and can log information provided through alternative channels. For example, in addition to reporting that an access point was offline for stations, specific conditions collected by stations can show processor loads, memory usage, settings, number of connections, Wi-Fi error logs sent from a station, and the like. Moreover, monitoring information collected through alternative channels can be reported. Various actions by the admin module 132 can be taken in response to troubleshooting, such as notifying a network administrator. The network administrator can then take action through a direct Bluetooth connection to the access points 120A-B to, for example, reconfigure devices, view or download logs, reset or reboot radios or devices, and the like. In one embodiment, network administration log on requires higher privileges and/or permissions.

The controller 130 (e.g., an MC1500 or MC6000 device by Meru Networks of Sunnyvale, Calif. as described in U.S. application Ser. No. 13/426,703 filed Mar. 22, 2012 and commonly-assigned and herein incorporated by reference) provides centralized management for access points. As a result, the controller 130 can assist by, for example, determining how to steer based on global conditions such as load, historical data, network conditions, preconfigured settings, network architecture, and the like. The controller 130 can provide many other services to the network 199 such as virtual cell and virtual port functionalities (also described in application Ser. No. 13/426,703).

In some embodiments, the controller 130 can comprise a Wi-Fi controller and an SDN (software defined networking) controller. As such, the BT applications 121A-B can implement OpenFlow rules.

Figure 2:
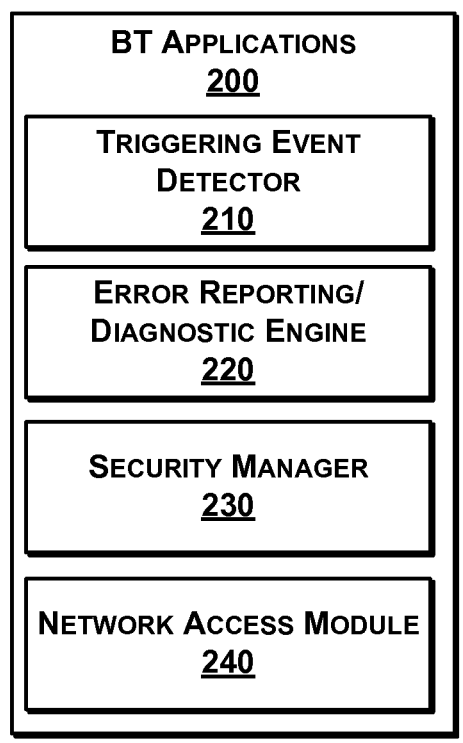
FIG. 2 is a more detailed block diagram illustrating sample BT applications of FIG. 1, according to one embodiment.

FIG. 2 is a more detailed block diagram illustrating sample BT applications 200, according to one embodiment. BT applications 200 can include one more of a number of applications. The example applications of FIG. 2 include triggering event detector 210, error reporting/diagnostic engine 220, security manager 230 and network access module 240.

The triggering event detector 210, in some embodiments, acts as a controller to activate alternative channels and interrogation processes upon triggering events. Events can include link outages, loss of contact with a specific device, long lag times, sleep mode, powering on or off, high congestion, low congestion, malware or suspicious activity, and the like. Triggering events can also deactivate alternative channels once an event or condition has ended. In some cases, an external resource such as the controller 130 can force a triggering event. Other triggering events can be programmed such as periodic downtimes.

The error reporting/diagnostic engine 220 can log conditions and events associated with triggering events. Externally, links can be tested. Internally, an operating system or application can be checked. Once a connection is reestablished, the log is uploaded to for review by an administrator. Also, as discussed above with respect to FIG. 3, neighboring devices with connectivity can be reached through alternative channels.

The security manager 230 can be executed from an isolated environment or security processor to determine whether triggering events are due to a compromise. Malware or rogue devices that are discovered are then reported to an administrator for remediation.

In some embodiments, the network access module 240 substitutes for Wi-Fi as a mechanism for exchanging data between a WAN and connected stations. Although much lower in bandwidth and amount of connections allowed, some data transfer can occur when Wi-Fi is unresponsive.

Figure 3:
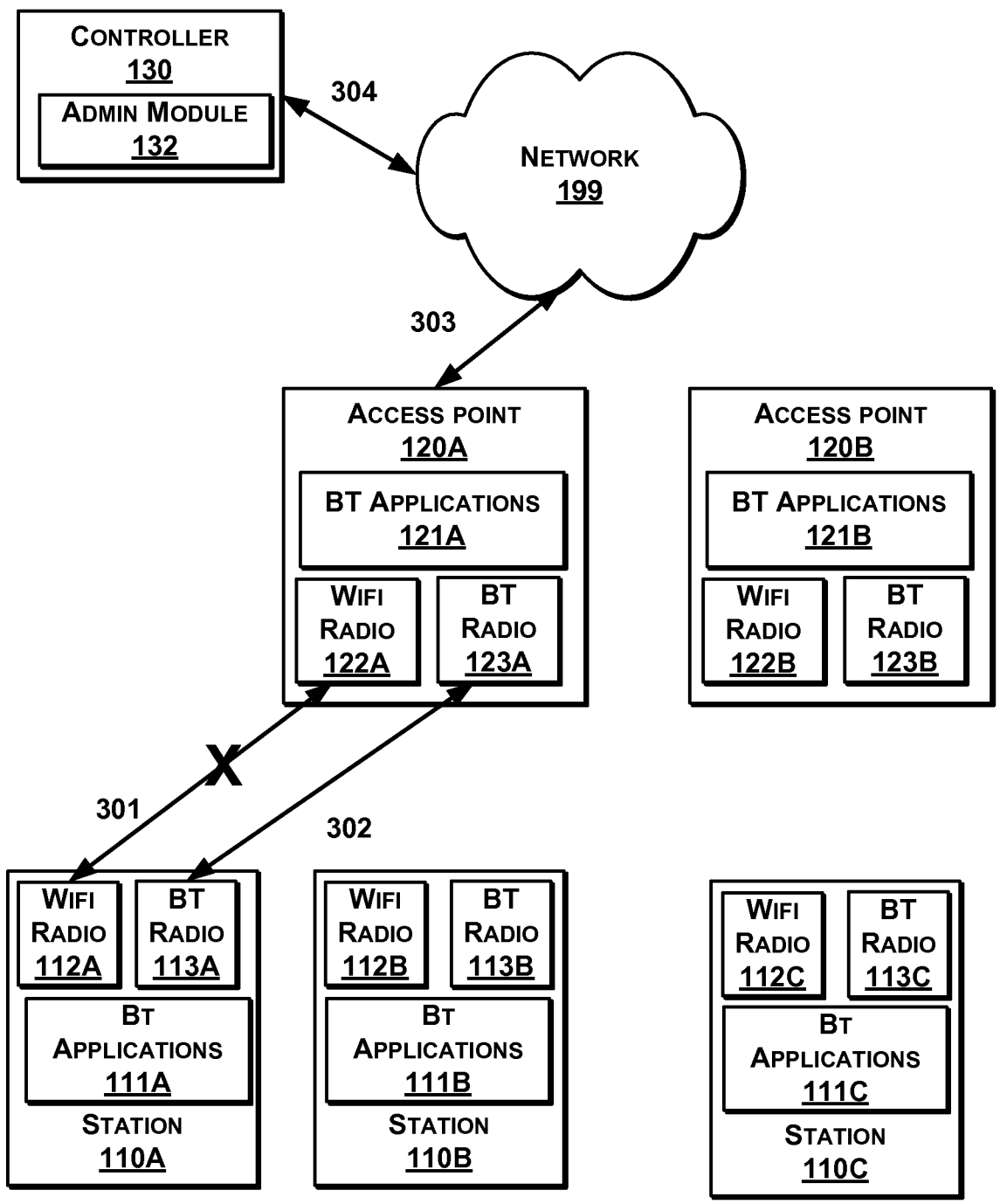
FIG. 3 is a sequence diagram showing interactions between components for upstream reporting of access point conditions, according to one embodiment.

FIG. 3 is a sequence diagram showing interactions between components of the system 100 for upstream reporting of access point conditions, according to one embodiment. More generally, varying levels of responsibility can be spread between the architecture of BT applications 111A-C executing on stations 110A-C, in combination with BT applications 121A-B executing on access points 120A-B, and admin module 132 executing on controller 130. Triggering conditions for alternative network conditions can occur at any level. In some embodiments, BT applications 111A-C do not exist on stations and in other embodiments, controller 130 add thus admin module 132 do not exist with the system 100.

More specific to the example of FIG. 3, the messages 301 over Wi-Fi are not responded to and cause a trigger condition, an alternative link is activated to send messages 302 concerning the error. The issue can be processed accordingly by the BT applications 121A and then reported to the controller 130 with messages 303, 304 over Ethernet or other wired channel.

Figure 4:
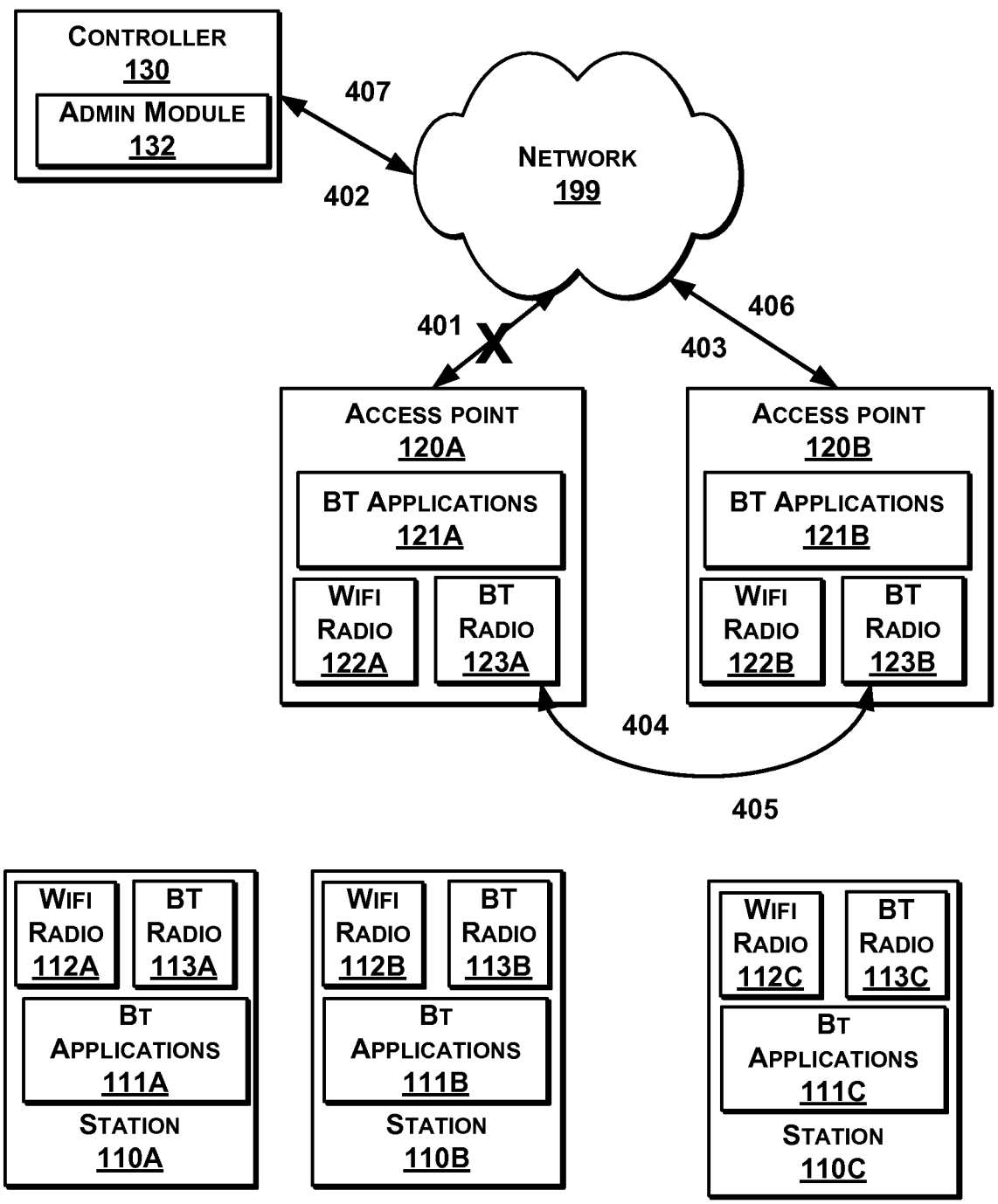
FIG. 4 is a sequence diagram showing interactions between components for downstream interrogation of access point conditions, according to one embodiment.

FIG. 4 is a sequence diagram showing interactions between components for of the system 100 for downstream interrogation of access point conditions, according to one embodiment. In this case, the controller 130 has lost communication due to messages 401 being sent without a response. Consequently, messages 402, 403 are sent over Ethernet to the access point 406 which sends messages 404 via Bluetooth. Responsive messages 405-407 are returned up the same path if possible.

Many other alternative data paths are possible. For example, stations can be used to pass messages until an access point or other uplink is reached. A smart telephone can use 3G, 4G, or even a telephone call as communication channels.

Figure 5:
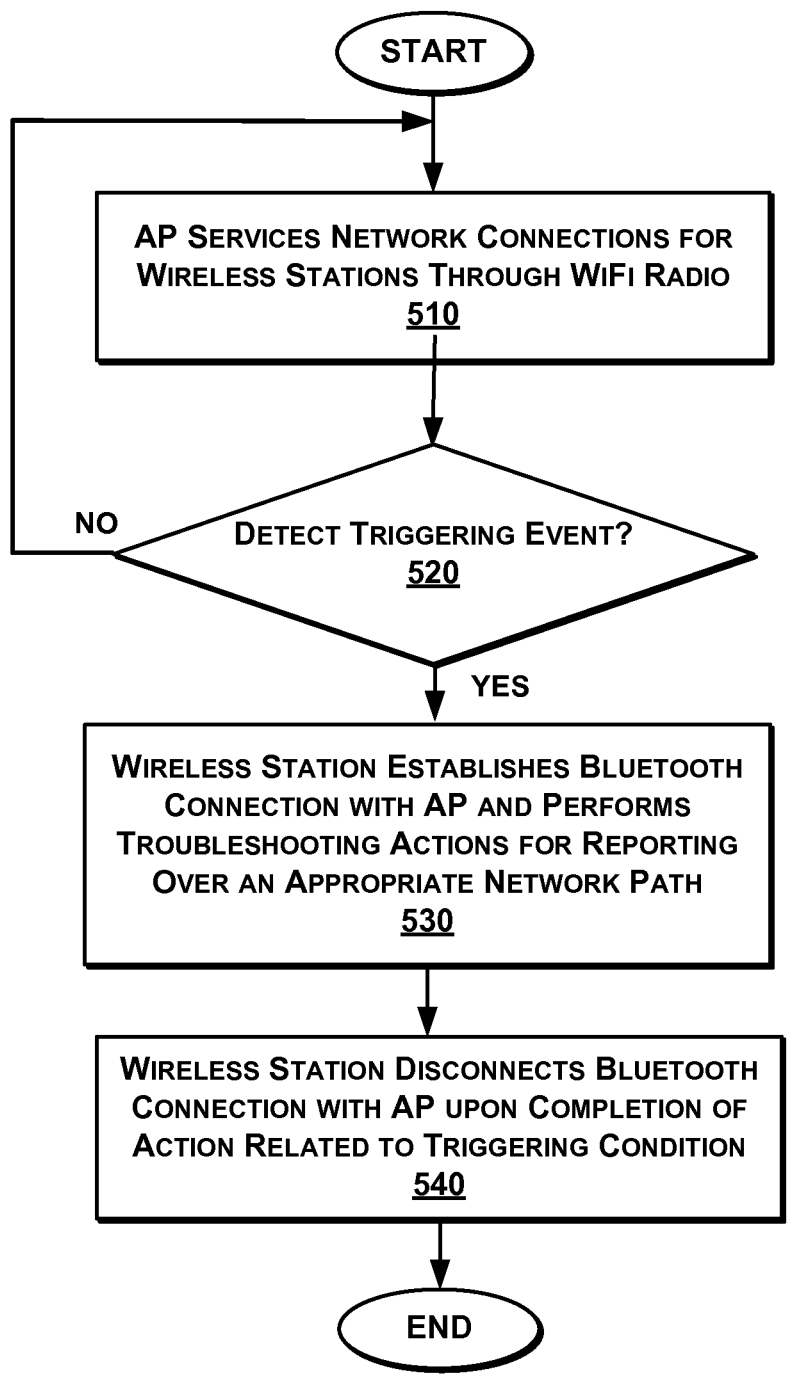
FIG. 5 is a high-level block diagram illustrating a method for alternative network communication for access point troubleshooting and monitoring, according to one embodiment.

Methods for Alternative Network Communication (FIG. 5)

FIG. 5 is a high-level block diagram illustrating a method 500 for alternative network communication for access point troubleshooting and monitoring, according to one embodiment.

An access point services network connections for wireless stations through a Wi-Fi radio using, for example, IEEE 802.11 protocols (step 510).

Responsive to a triggering condition (step 530), a wireless station (either one already connected or one initiating a new connection) establishes a Bluetooth connection (step 530). Once connected, troubleshooting actions can be performed in some embodiments. Results can or logs can be sent to a controller from the access point. In one case, where a connection to the controller is not possible through the access point, a separate Bluetooth connection to another access point in touch with the controller is possible.

In step 540, the wireless station disconnects the Bluetooth connection with an access point upon completion of actions. In some modes, Bluetooth provides a point-to-point communication channel that only allows one station to connect to an access point at a time. In other modes, some versions of Bluetooth provide a limited communication channel that allows, for example, five to seven connections. Therefore, the connection is actively terminated to allow other stations to continue reporting issues, and monitoring statuses, for a more robust definition of problems and conditions.

Figure 6:
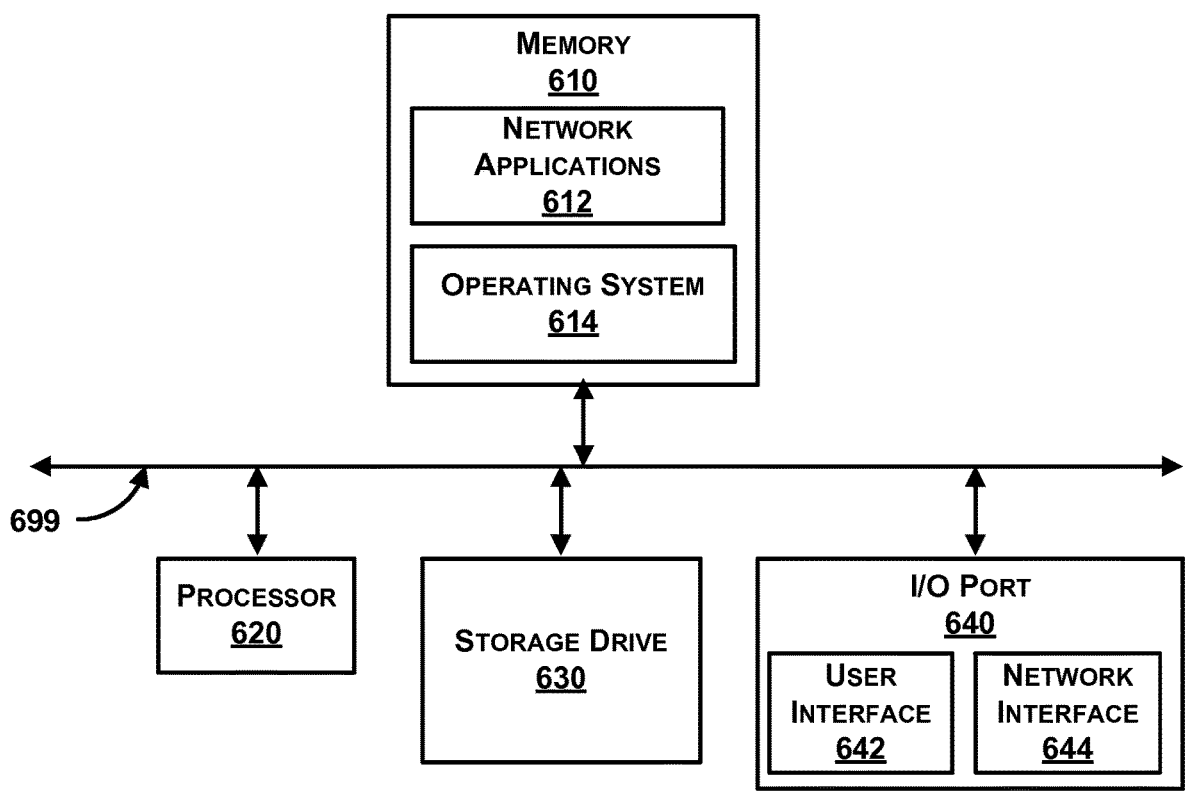
FIG. 6 is a block diagram illustrating an exemplary computing device, according to one embodiment.

Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, including the controller access point 110, the access points 120A, B, the cloud-based Wi-Fi controller 140, and the station 130. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of the SDN controller access point 110, the access points 120A, B, the cloud-based Wi-Fi controller 140, or the station 130, as illustrated in FIGS. 1-4. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 65, 68, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM, Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in an access point in a Wi-Fi communications network, of using alternative networks for troubleshooting or monitoring, the method comprising the steps of:
    providing access for at least one station over a Wi-Fi channel to connect with a wired backbone network;
    detecting a triggering event indicative of a communication issue associated with Wi-Fi communications of the access point;
    responsive to the triggering event detection, establishing a Bluetooth channel for communication with the at least one station for collecting data associated with the triggering event by actively interrogating the access point to find a solution;
    detecting an end to the triggering event;
    responsive to the triggering event end, deactivating the Bluetooth channel and resuming access for the at least one station over the Wi-Fi channel.

2. The method of claim 1, further comprising:
    reporting the collected data concerning the triggering event to a controller.

3. The method of claim 1, further comprising:
    receiving RSSI values responsive to the interrogation.

4. The method of claim 1, wherein: the triggering event detection is initially determined by the at least one station which notifies the access point through the Bluetooth channel.

5. The method of claim 1, wherein the triggering event comprises at least one of: a link failure, failure of the at least one station, failure of the access point, powering down, sleep mode, network congestion, long flight times for packets, processor load, memory shortage, and processing load.

6. The method of claim 1, further comprising:
    utilizing the Bluetooth channel for communications between an external network and the at least one station, during the triggering event.

7. The method of claim 1, wherein the access point comprises at least one Wi-Fi radio and at least one Bluetooth radio.

8. The method of claim 1, wherein the triggering event comprises suspicious activity and the Bluetooth channel is activated to discretely communicate the suspicious activity without alerting the source of the suspicious activity.

9. A non-transitory computer-readable medium storing source code that, when executed by a processor, performs a method in an access point in a Wi-Fi communications network, of using alternative networks for troubleshooting or monitoring, the method comprising the steps of:
    providing access for at least one station over a Wi-Fi channel to connect with a wired backbone network;
    detect triggering event indicative of a communication issue associated with Wi-Fi communications of the access point;
    responsive to the triggering event detection, establishing a Bluetooth channel for communication with the at least one station for collecting data associated with the triggering event by actively interrogating the access point to find a solution;
    detecting an end to the triggering event;
    responsive to the triggering event end, deactivating the Bluetooth channel and resuming access for the at least one station over the Wi-Fi channel.

10. An access point in a Wi-Fi communications network, of using alternative networks for troubleshooting or monitoring, the access point comprising:
    a processor; and
    a memory coupled to the processor, storing a BT application to:
        provide access for at least one station over a Wi-Fi channel to connect with a wired backbone network;
        detect triggering event indicative of a communication issue associated with Wi-Fi communications of the access point;
        responsive to the triggering event detection, establish a Bluetooth channel for communication with the at least one station for collecting data associated with the triggering event by actively interrogating the access point to find a solution;
        detect an end to the triggering event; and
        responsive to the triggering event end, deactivate the Bluetooth channel and resume access for the at least one station over the Wi-Fi channel.

* * * * *